(No Model.)
D. N. LUSE & J. W. BELL.
PLOW.
No. 287,143. Patented Oct. 23, 1883.
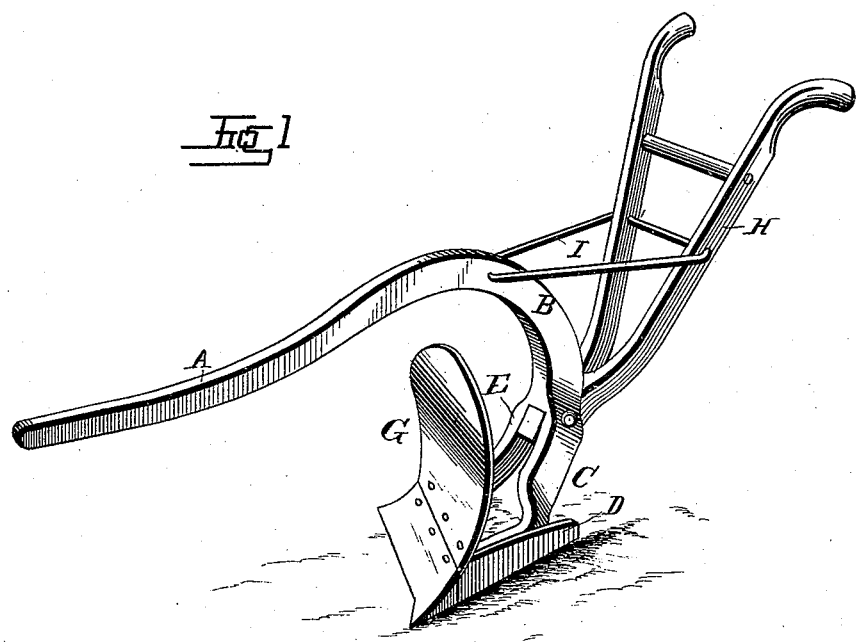
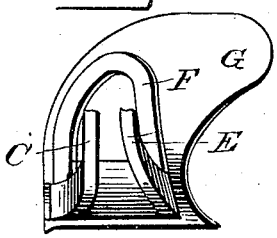 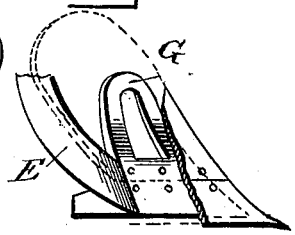 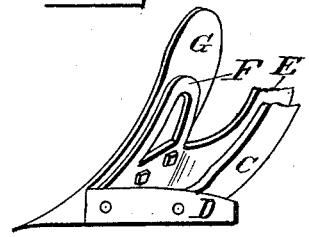
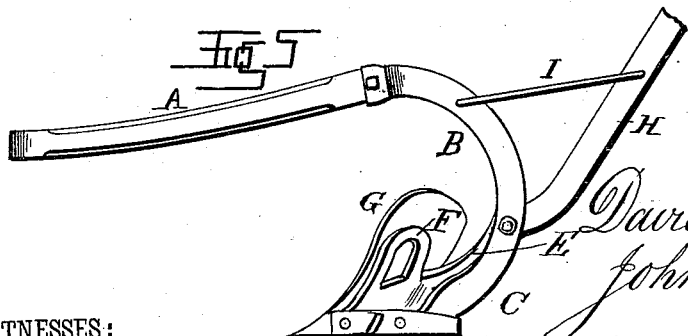
WITNESSES:
David N. Luse
John W. Bell
INVENTORS.
By Louis Bagger & Co.
ATTORNEYS.

UNITED STATES PATENT OFFICE.

DAVID N. LUSE AND JOHN W. BELL, OF AUDUBON, IOWA.

PLOW.

SPECIFICATION forming part of Letters Patent No. 287,143, dated October 23, 1883.

Application filed July 19, 1883. (No model.)

*To all whom it may concern:*

Be it known that we, DAVID N. LUSE and JOHN W. BELL, citizens of the United States, and residents of Audubon, in the county of Audubon and State of Iowa, have invented certain new and useful Improvements in Plows; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved plow. Fig. 2 is a rear view of the lower portion of the same. Fig. 3 is a side view of the same, seen from the side of the mold-board, which is broken away, and shown in dotted lines. Fig. 4 is a side view from the land side, and Fig. 5 is a side view of the plow when the beam is made of wood.

Similar letters of reference indicate corresponding parts in all the figures.

Our invention has relation to plows; and it consists in the improved construction and combination of parts of the beam and handles, as hereinafter more fully described and claimed, by which ease of attaching the landside and mold-board and lightness of draft are obtained.

In the accompanying drawings, the letter A indicates the beam, which, when made of iron or steel, is made curved at its rear end, forming the standard B continuous with the beam. The lower end of this standard is bifurcated, forming an arm, C, to the lower horizontal part of which the landside D is secured, and an arm, E, the lower horizontal portion of which is widened, connected at its end with the end of the arm upon which the landside is fastened, and provided upon its upper end with a loop or horseshoe shaped bar, F, which is slightly curved outward, upon which and the horizontal end of arm E the mold-board G is secured. The handles H are inserted with their lower ends into the fork of the standard, and secured there, and are furthermore braced by means of a triangular brace-rod, I, passing through the handles at or near their middle, and fastened at their ends to the beam at its curve. When the beam is made of wood, the upper part of the curved standard is made flat or in shape of a socket, for the secure fastening of the wooden beam, the standard and the handles being of the same construction as when the beam is made of iron or steel.

It will be seen that by constructing the beam and standard in this manner a new landside or mold-board may be fastened upon the frame formed by the lower ends of the standard, and that the bifurcated ends of the standard will allow clods or bunches of weeds to pass through without clogging the plow, thus rendering the draft lighter, and the handles may be inserted in a moment of time, and will be securely braced by the triangular rod.

Having thus described our invention, we claim and desire to secure by Letters Patent of the United States—

1. In a plow, a standard having its lower end bifurcated, forming two arms having their ends united, one end forming a horizontal portion adapted to have the landside fastened to it, and the other end forming a horizontal wide portion having a horseshoe-shaped bar fastened upon its upper edge, and adapted to have the mold-board fastened upon it, and the horseshoe-shaped bar, as and for the purpose shown and set forth.

2. The combination, in a plow, of a standard, bifurcated at its lower end, forming a frame, provided with a horseshoe shaped bar for the securing of the mold-board and the landside, as described, handles of the usual construction secured at their lower ends in the fork formed by the standard, and a triangular rod passing through the handles and secured at its ends to the standard, as and for the purpose shown and set forth.

3. The herein-described plow, consisting of a beam curved at its rear end, forming a bifurcated standard having its lower end bifurcated to form a frame for the securing of the mold-board and landside, as described, a mold-board and landside of the usual construction, handles of the usual construction fastened at their lower ends in the fork of the standard, and a triangular brace-rod passing through the middle of the handles, and fastened at its ends to the curve of the beam, all constructed and combined as and for the purpose shown and set forth.

In testimony that we claim the foregoing as our own we have hereunto affixed our signatures in presence of two witnesses.

DAVID N. LUSE.
JOHN W. BELL.

Witnesses:
A. L. SANBORN,
J. T. TRAVIS.